(12) United States Patent
Park et al.

(10) Patent No.: US 9,740,078 B2
(45) Date of Patent: Aug. 22, 2017

(54) PHOTONIC PHASED ARRAY ANTENNA

(71) Applicant: Korea Advanced Institute of Science and Technology, Daejeon (KR)

(72) Inventors: Hyo Hoon Park, Daejeon (KR); Jong Hun Kim, Daejeon (KR); Sun Kyu Han, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 154 days.

(21) Appl. No.: 15/043,199

(22) Filed: Feb. 12, 2016

(65) Prior Publication Data

US 2017/0131615 A1    May 11, 2017

(30) Foreign Application Priority Data

Nov. 10, 2015  (KR) ........................ 10-2015-0157657

(51) Int. Cl.
| | | |
|---|---|---|
| *G02F 1/29* | (2006.01) | |
| *G02F 1/295* | (2006.01) | |
| *G02F 1/025* | (2006.01) | |
| *G02F 1/015* | (2006.01) | |

(52) U.S. Cl.
CPC ............ *G02F 1/2955* (2013.01); *G02F 1/025* (2013.01); *G02F 2001/0151* (2013.01); *G02F 2202/36* (2013.01)

(58) Field of Classification Search
CPC ......... H01L 2924/12042; H01L 29/155; G02F 2201/205; G02F 2201/36; G02F 2001/0151; G02F 1/2955; G02F 1/218; G02F 1/292; G02F 1/25; G02F 1/13
See application file for complete search history.

(56) References Cited

U.S. PATENT DOCUMENTS

| | | | | |
|---|---|---|---|---|
| 8,988,754 | B2 * | 3/2015 | Sun | G02B 6/26 359/238 |
| 2004/0058686 | A1 * | 3/2004 | Odman | H04L 1/0007 455/450 |
| 2004/0145026 | A1 * | 7/2004 | Sun | H01L 31/0232 257/459 |
| 2014/0231627 | A1 * | 8/2014 | Wakatsuki | H01Q 3/2676 250/208.2 |
| 2015/0141267 | A1 * | 5/2015 | Rothberg | C12Q 1/6869 506/2 |

* cited by examiner

*Primary Examiner* — Thomas A Hollweg
*Assistant Examiner* — Mary A El Shammaa
(74) *Attorney, Agent, or Firm* — Marshall, Gerstein & Borun LLP

(57) ABSTRACT

Disclosed is a device which constitutes a photonic phased array antenna. The device includes at least one light source, an optical power distributor configured to distribute a light wave generating from the light source, a phase controller configured a phase of the light wave, and a light wave radiator configured to radiate the light wave into a space based on the controlled phase. Optical waveguides are connected between the light source and the optical power distributor, between the optical power distributor and the phase controller and between the phase controller and the light wave radiator, respectively.

9 Claims, 15 Drawing Sheets

PHOTONIC PHASED ARRAY ANTENNA

CROSS-REFERENCE TO RELATED APPLICATIONS

A claim for priority under 35 U.S.C. §119 is made to Korean Patent Application No. 10-2015-0157657 filed Nov. 10, 2015, in the Korean Intellectual Property Office, the entire contents of which are hereby incorporated by reference.

BACKGROUND

Embodiments of the inventive concept described herein relate to a structure of a photonic phased array antenna, and more particularly, relate to an apparatus for forming a light beam in a narrow region due to light wave interference by controlling the phases of light waves supplied to each nanophotonic radiator disposed in an array to radiate light waves into free space.

A photonic phased array antenna is used as a light source for scanning a light beam to scan an image for an autonomous car or a robot. For such an application, preferable performances, such as a small size, high light beam radiation efficiency, a fine beam formation, a large beam scanning range, and a rapid beam scanning speed, are required to the photonic phased array antenna. Thus, to first achieve miniaturization, there is a need to propose a nanophotonics-based photonic phased array antenna using a semiconductor material. When a nanophotonics-based photonic phased array antenna using a semiconductor material is to be implemented, since a size of the device is small, there may be complex limitations to secure various performances.

There has been proposed a nanophotonics-based photonic phased array antenna disclosed in US Patent Application No. 2014/0192394 A1, where phase control photonic devices are integrated in matrix. The photonic passed array antenna according to the related art controls the phase of a light wave by using a principle of varying a refractive index based on a thermos-optic effect. According to the invention disclosed in US Patent Application No. 2014/0192394 A1, an optical delay line is installed at a front end of an antenna, and current is supplied to the optical line to heat the optical delay line. When the temperature of the optical delay line is increased as the optical delay line is heated, the refractive index of the optical delay line is increased according to the thermos-optic effect, so that the phase of the light wave passing through the optical delay line is varied. However, since the invention utilizes the thermos-optic effect, the power consumed to heat a semiconductor element is great, and the control speed is slow.

The disposal of a light wave supply line is an important design parameter of the phased array antenna. The invention employs a direct distribution scheme of supplying a light wave to unit antenna devices arrayed in a matrix. In other words, according to the direct distribution scheme, a light wave is injected to a linear optical waveguide, several optical couplers are installed on side surface of the liner optical waveguide, and optical power is sequentially extracted from each optical coupler such that the optical power is supplied to a unit antenna device. However, since the direct distribution scheme extracts a part of the optical power which is left over after the power is distributed to a preceding unit device in order to supply the extracted power to a next unit device, it is difficult to supply unit optical power to each unit device.

SUMMARY

An embodiment of the inventive concept provides structures of devices constituting a nano-photonics-based photonic phased array antenna and an arrangement thereof.

Another embodiment of the inventive concept provides a scheme of scanning a beam at an enlargeable angle in lateral and longitudinal directions in a space through which the beam is radiated to a phased array antenna.

An embodiments of the inventive concept is directed to provide a device constituting a photonic phased array antenna, which includes at least one light source, an optical power distributor configured to distribute a light wave generated from the light source, a phase controller configured to control a phase of the light wave, and a light wave radiator configured to radiate the light wave into a space based on the controlled phase. Optical waveguides may be connected between the light source and the optical power distributor, between the optical power distributor and the phase controller and between the phase controller and the light wave radiator, respectively.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Hereinafter, embodiments will be described in detail with reference to accompanying drawings.

Figure 1:
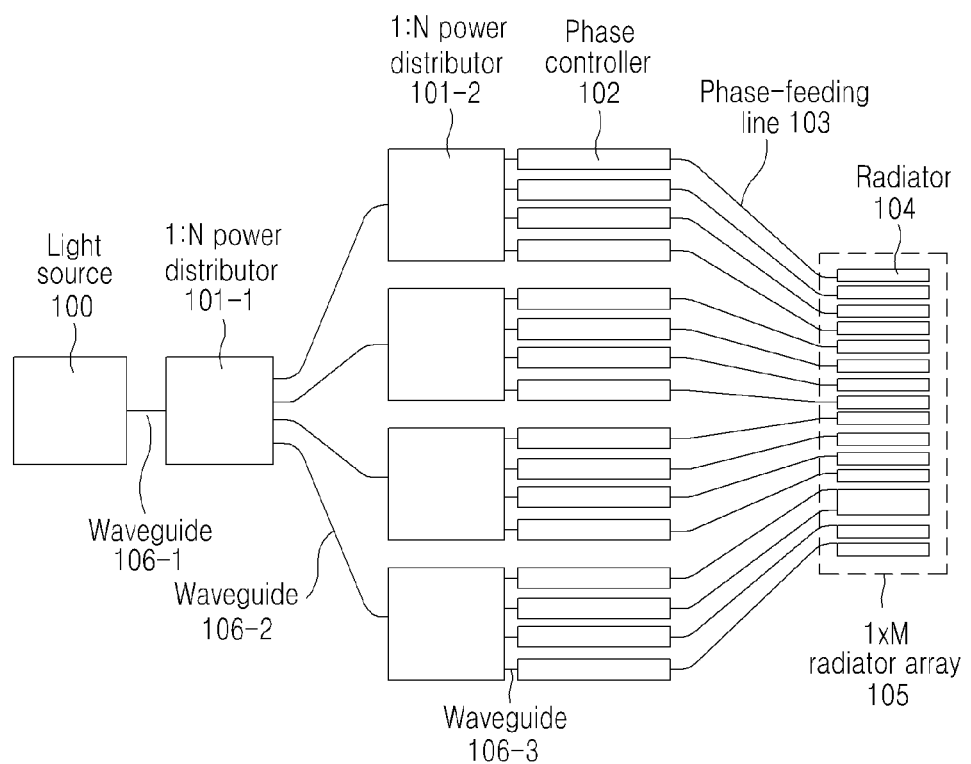
FIG. 1 is a schematic view illustrating the disposal of devices constituting a photonic phased array antenna according to an embodiment.

FIG. 1 is a schematic view illustrating the arrangement of devices constituting a photonic phased array antenna according to an embodiment.

The main devices constituting a photonic phased array antenna may include a power distributor 101, a phase controller 102 and a light wave radiator 104. Optical waveguides 106-1, 106-2 and 106-3 may be connected between the devices, that is, between the light source 100 and the optical power distributor 101-1, between the optical power distributor 101-1 and 101-2, and between power distributor 101-2 and phase controller 102, respectively. Since couplings may occur between the optical waveguides due to the high density of the optical waveguides connected between the phase controller 102 and the light wave radiator 104, the arrangement is very important. In the following description, the optical waveguide connected between the phase controller 102 and the light wave radiator 104 will be referred to as a phase-feeding line 103.

To miniaturize the photonic phased array antenna according to the embodiment, the optical power distributor 101, the phase controller 102, the light wave radiator 104, and the optical wave guide 106 which are the devices constituting the photonic phased array antenna may be formed of a semiconductor material. In this case, the semiconductor material may include silicon or compound semiconductor, and in addition, a dielectric material, such as silicon oxide, silicon nitride, etc., used for manufacturing an optical device made of the silicon or compound semiconductor and metallic thin layer materials. Since it is suitable that geometric sizes of the semiconductor-based devices according to the embodiment are approximate to or less than the wavelength of a light wave, the sizes of the semiconductor devices may correspond to a nanophotonic region.

As the light source 100, a laser light source capable of providing a phase coherent light may be used. Although it is preferable to use a general continuous wave (CW) light source as the light source, the embodiment is not limited thereto, and a modulated or coded light source may be used to additionally provide a function of measuring a distance. The light source 100 may be directly coupled to the optical waveguide 106-1 or may be coupled to the optical waveguide 106-1 through an optical fiber, a grating coupler or a beam inverter. The optical waveguides 106-1, 106-2 and 106-3 may be generally formed of semiconductor or an insulating material, and may be prepared in a structure of a rib-shaped or channel-shaped waveguide. The wavelength of the light source may be selected from the wavelength band in which optical loss of the optical waveguide 106 is minimized.

The optical power distributor 101 distributes the light wave output from the single light surface 100 to N phase controllers 102 (where N is a natural number). To distribute optical power, the optical power distributor 101 may be prepared with a single optical power distributor for distributing optical power at 1:N or by connecting N optical power distributors to each other in a multiple stage manner. FIG. 1 shows one example of the optical power distributor 101 in which 1:4 distributors are connected in two stages for the purpose of 1:16 distribution. As another example, in case of using 1:2 distributors, the 1:2 distributors may be connected to each other in four stages to obtain 1:16 distribution. The 1:N distributor may be implemented by using an optical device such as a multi-mode interface (MMI) coupler, a beam splitter, etc.

The phase controller 102 controls the phase of a light wave such that light waves, the phase difference between which are equal to each other, are supplied to each radiator 104 of the radiator array 105. Examples of the phase controller 102 are shown in FIGS. 2 and 3. FIG. 3 shows a phase controller 102 using a P-I-N junction structure. "I" region in the P-I-N junction structure represents an intrinsic region.

Figure 2A:
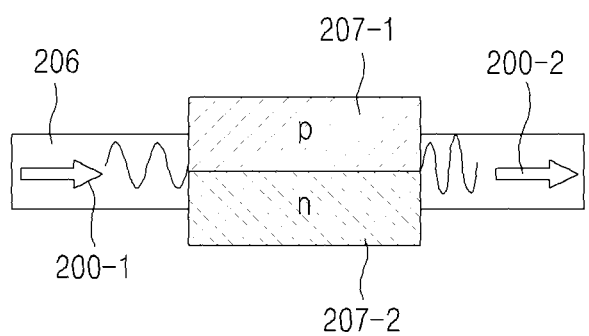
FIGS. 2A and 2B are schematic views illustrating a structure of a phase controller device using a semiconductor P-N junction structure according to an embodiment.
Figure 2B:
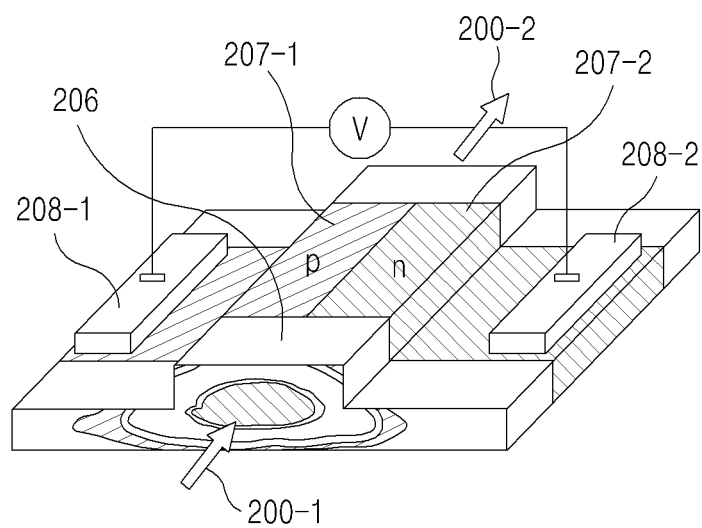

FIGS. 2A and 2B are schematic views illustrating a structure of a phase controller device using a semiconductor P-N junction structure according to an embodiment.

FIG. 2A is a sectional view illustrating a structure of a phase controller device using a semiconductor P-N junction structure according to an embodiment. FIG. 2B is a perspective view illustrating the semiconductor P-N junction structure.

The phase controller may be formed in a semiconductor P-N junction structure or a semiconductor P-I-N junction structure. As a voltage is applied or current is injected to the phase controller, the carrier concentration is varied so that the refractive index is varied due to electro-optic effect, thereby controlling the phase.

The phase controller may be formed in the following P-N junction structure. For example, referring to FIGS. 2A and 2B, in the P-N junction structure of the phase controller, the P-type doped region 207-1 and N-type doped region 207-2 may be formed in or near the optical waveguide 206. Electrodes 208-1 and 208-2 may be formed on the P-type doped region 207-1 and N-type doped region 207-2 near the optical waveguide 206. When a voltage or current is applied between both electrodes 208-1 and 208-2 in a state that a light wave 200-1 is input to the optical waveguide 206, electrons and holes are increased by electro-optic effect, that is, free carrier plasma dispersion (FCPD) effect, so that the refractive index of the phase controller is varied. Thus, the phase of the light wave 200-2 output through the doped regions 207-1 and 207-2 may be varied due to the change of the refractive index. Since the electro-optic and FCPD effects are well known in the art, the details will be omitted.

Figure 3A:
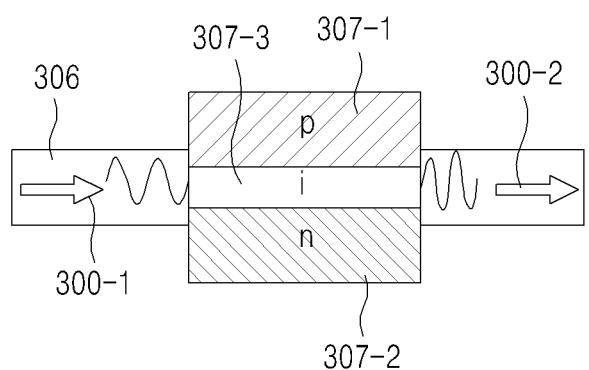
FIGS. 3A and 3B are schematic views illustrating a structure of the phase controller using the semiconductor P-I-N junction structure according to an embodiment.
Figure 3B:
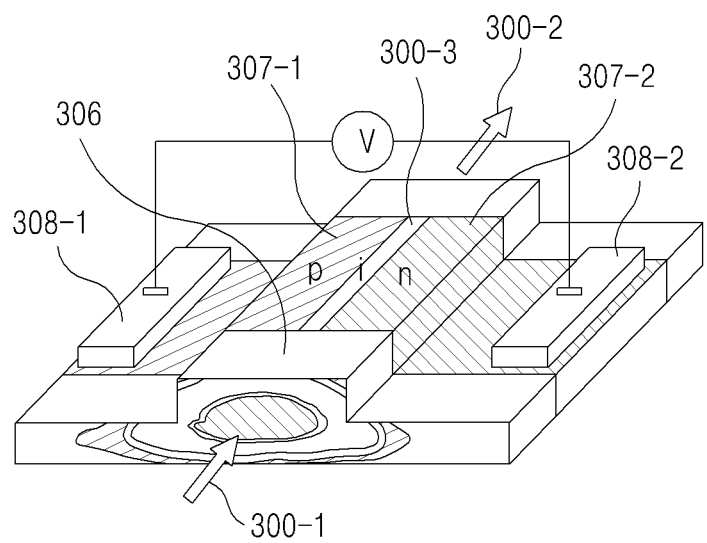

FIGS. 3A to 3C are schematic views illustrating a structure of the phase controller using the semiconductor P-I-N junction structure according to an embodiment, where FIG. 3A is a sectional view and FIG. 3B is a perspective view.

The phase controller may be formed in a P-I-N junction structure as follows. For example, referring to FIGS. 3A and 3B, in the P-I-N junction structure of the phase controller, the P-type doped region 307-1, Intrinsic or I region 307-3 and N-type doped region 307-2 may be formed in or near the optical waveguide 306. Electrodes 208-1 and 208-2 may be formed on the P-type doped region 207-1 and N-type doped region 207-2 near the optical waveguide 206. When a voltage or current is applied between both electrodes 208-1 and 208-2 in a state that a light wave 300-1 is input to the optical waveguide 206, as described in FIGS. 2A and 2B, the refractive index of the phase controller may be varied due to FCPD effect, so that the phase of the light wave 200-2 output through the doped regions 307-1 and 307-2 is varied according to the change of the refractive index.

In this case, the phase controller may vary the refractive index by applying a forward or reverse voltage to the P-N junction structure or the P-I-N junction structure. A method of more effectively varying the refractive index by applying a voltage or current is to apply a reverse voltage to extract carriers in case of the P-N junction structure described in FIGS. 2A and 2B or apply a forward voltage to inject carriers in case of the P-I-N junction structure described in FIGS. 3A to 3C. Alternatively, a method of more effectively varying the refractive index by applying a voltage or current is to suitably control the applied voltage value such that the phase of the output light wave 200-2 or 300-2 is suitably varied.

Figure 4A:
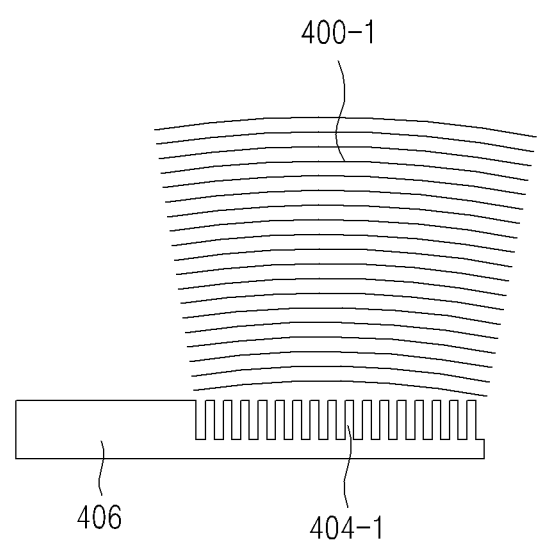
FIGS. 4A to 4C are sectional views illustrating a structure of a light wave radiator device according to an embodiment.
Figure 4B:
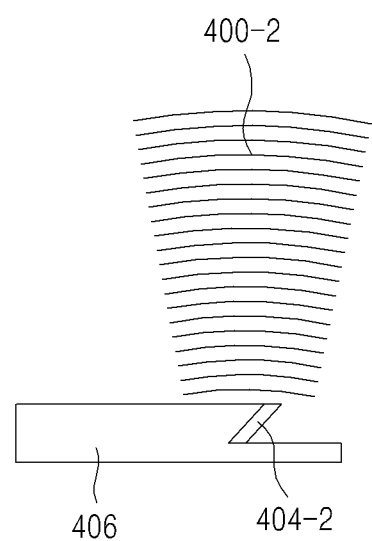
Figure 4C:
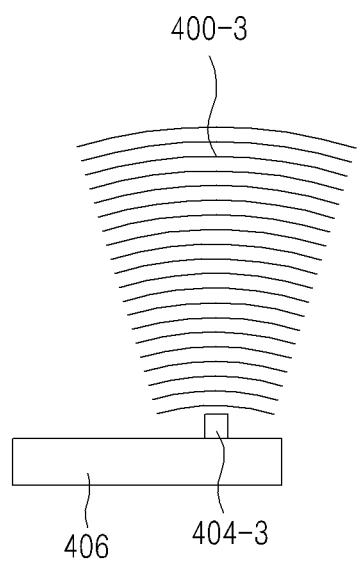

FIGS. 4A to 4C are sectional views illustrating a structure of a light wave radiator device according to an embodiment.

The light wave radiator may be formed in at least one of a grating structure, a mirror structure, or a nano-metal thin layer structure.

Referring to FIG. 4A, the light wave radiator may be formed in a grating structure. The light wave radiator may be provided at an end of the optical waveguide 406 with a grating 404-1. In the grating structure of the light wave radiator, the light wave collides with the grating 404-1 to be scattered so that a light wave is radiated to an upper space over the grating.

The grating structure of the light wave radiator 404-1 may be designed based on following Equation 1 according to a diffraction principle.

$$\lambda_0 / \Lambda_G = n_{\textit{eff}} - n_c \sin \theta \qquad \text{Equation 1:}$$

Where $\lambda_0$ is a central wavelength of a light wave in a vacuum state, $\Lambda_G$ is a period of a grating, $n_{\textit{eff}}$ is an effective refractive index of an optical waveguide including a grating, $n_c$ is a refractive index of a clad surrounding a core of an optical waveguide, and $\theta$ is a radiation angle corresponding to the center of the light having the strongest intensity in the diffraction pattern formed by the diffraction of the light waves scattered on periodic gratings. In addition, $\theta$ is an angle with respect to a normal line to a surface of a grating. When an upper portion of a light waveguide core is a free space, $n_c$ is 1.

Referring to FIG. 4B, the light wave radiator may be formed in a mirror structure. In the mirror structure, the light wave radiator may radiate a light wave 400-2 to an upper space over the grating through reflection of the light wave.

In the mirror structure, the light wave radiator 404-2 is provided on an end of the optical wave guide 406 with an inclined mirror surface. A radiation angle $\theta$ may be determined by selecting an angle of the mirror surface. For example, when the mirror surface of the light wave radiator 404-2 is inclined at 45°, a light wave may be radiated in a normal direction. When the mirror surface of the light wave radiator 404-2 is inclined at an acuter angle than 45°, a light wave may be radiated in a direction inclined in a propagating direction of the optical waveguide rather than the normal direction. When the mirror surface of the light wave radiator 404-2 is inclined at an obtuser angle than 45°, a light wave may be radiated in a direction inclined in an opposite direction to the propagating direction of the optical waveguide rather than the normal direction.

Referring to FIG. 4C, the light wave radiator may be formed in a nano-metal thin layer structure. In the nano-metal thin layer structure, the light wave radiator may radiate a light wave 400-3 by surface plasmonics which occurs on the nano-metal thin layer.

In the nano-metal thin layer structure of the light wave radiator 404-3, a metal thin layer may be formed on an end of the optical waveguide 406 and a thickness of the thin layer may be nearly approximate to or thinner than a skin depth. The light wave radiator 404-3 may radiate a light wave 400-3 by surface plasmonics which occurs on the metal thin layer. To improve radiation efficiency, it is preferable to use a quasi-bound mode or a radiative mode rather than a bound mode classified from the surface plasmonics. The radiation angle $\theta$ of the light wave radiator 404-3 may be determined by suitably controlling the kind of a metal material and a geometric variable such as a thickness, a width, a length or a form of the metal thin layer.

Figure 5:
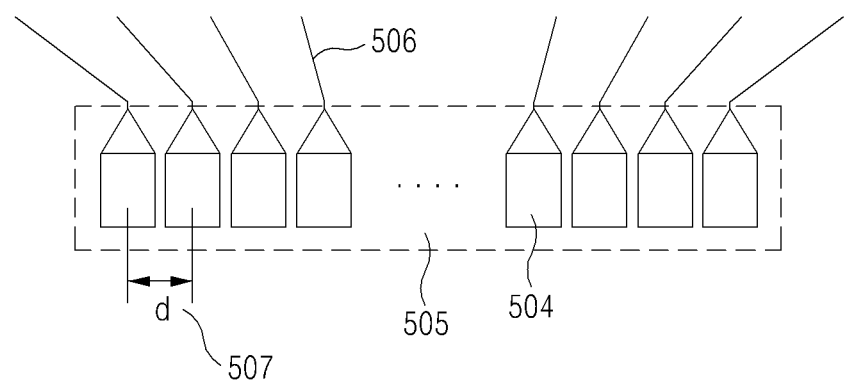
FIG. 5 is a view illustrating a light wave radiator having a 1×M radiator array configured in a one-dimensional phased array.

FIG. 5 is a view illustrating a light wave radiator having a 1×M radiator array configured in a one-dimensional phased array.

The light wave radiator may be formed in a 1×M array. Referring to FIG. 5, although the light wave radiator 504 includes the grating structure 404-1 of FIG. 4A, the embodiment is not limited thereto and the light wave radiator 504 may include the mirror structure of FIG. 4B or the nano-metal thin layer structure 404-3 of FIG. 4C.

Figure 6A:
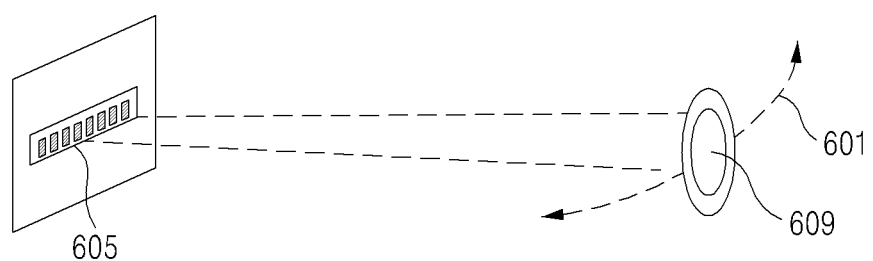
FIGS. 6A and 6B are schematic views illustrating a light beam scanning scheme using an 1×M radiator array disposed in an one-dimensional phased array.
Figure 6B:
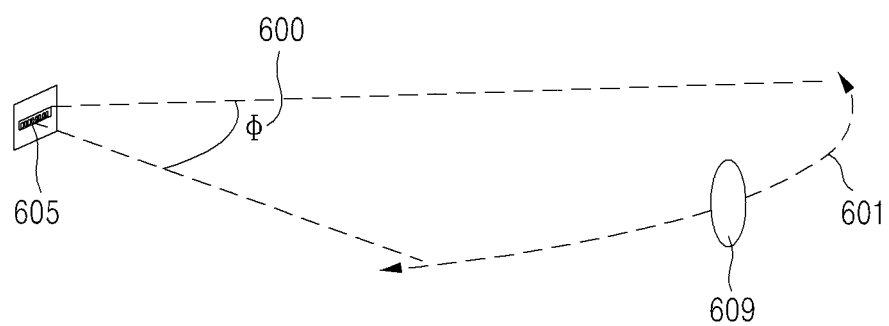

FIGS. 6A and 6B are schematic views illustrating a light beam scanning scheme using a 1×M radiator array disposed in a one-dimensional phased array.

The light wave radiator may be formed as a 1×M radiator array. FIGS. 6A and 6B illustrate a process of forming a light bean and scanning the light beam using the 1×M radiator array 605.

The phase of the light wave input to the 1×M radiator array 605 is varied by each radiator, so that the light waves having an equivalent phase difference therebetween are output from the radiators, so a phase coherent beam 609 having a narrow divergence angle in a space in a specific direction due to the interference between the radiated light waves may be formed. According to a phase interference principle, the phase coherent beam obtained from the phased array may be formed with beams of $0^{th}$-order, $1^{st}$-order, $2^{nd}$-order, . . . . The equivalent phase differences $\Delta\phi$ of each light way radiator are sequentially varied in $-\pi \leq \Delta\phi \leq +\pi$, so that the phase coherent beam 609 is propagated along a lateral trajectory 601 in space to provide a beam scanning function. In this case, the lateral direction represents an alignment direction of the radiator array 605. When a plurality of interference beams is formed in the lateral direction, since the beam of $0^{th}$-order has the strongest intensity, the beam of $0^{th}$-order is mainly operated in a beam scanning. FIGS. 6A and 6B schematically show a section of the beam of $0^{th}$-order at a specific distance. The lateral scanning angle of the beam of $0^{th}$-order, that is, the range of the longitude angle $\Phi$ 600 of azimuthal angle in spherical coordinates is determined by the lateral interval d 507 between the radiators in the light wave radiator of FIG. 5. According to the phase interference principle, as the interval d 507 between the radiators of the phased array is narrowed, the range of the lateral scanning angle $\Phi$ 600 may be more enlarged.

It is difficult to perform the scanning in a latitude direction, that is, a longitudinal direction only by varying the phase in the 1×M radiator array. Thus, a structure of arranging a plurality of 1×M radiator arrays in a longitudinal direction is proposed for the purpose of the scanning in a latitude direction.

Figure 7:
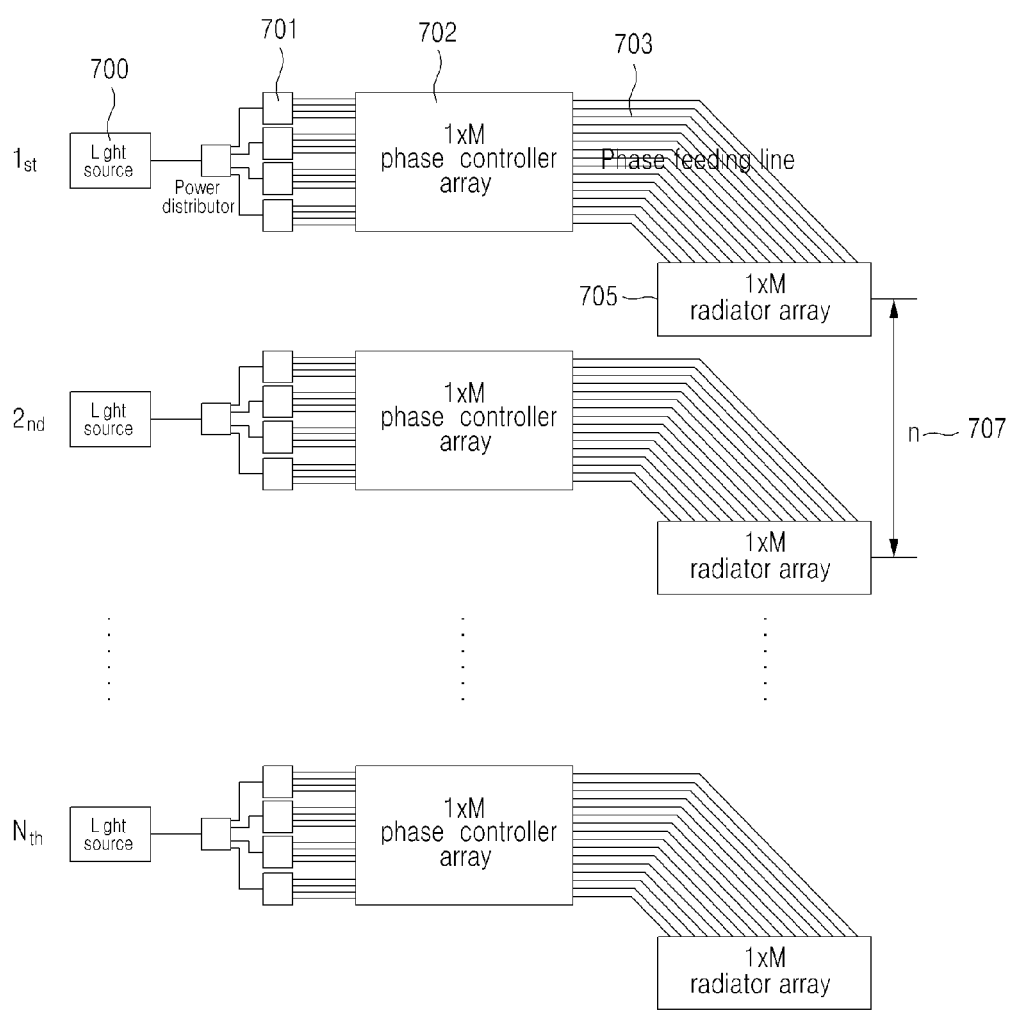
FIG. 7 is a view illustrating the disposal of an (1×M)×N phase array in which plural 1×M radiator arrays are vertically disposed according to an embodiment.
Figure 8:
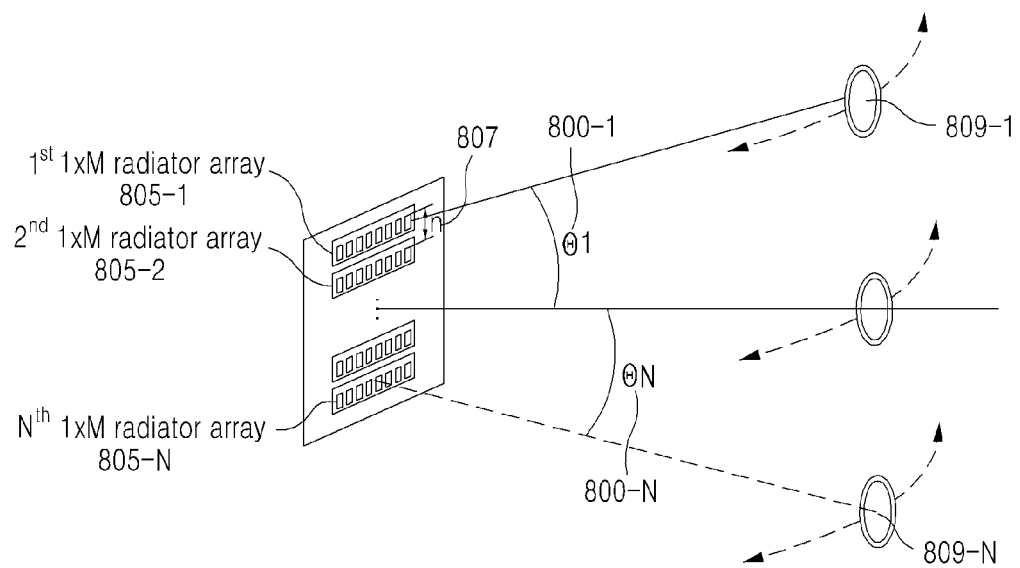
FIG. 8 is a schematic view illustrating a scheme of scanning a light beam using the (1×M)×N phase array of FIG. 7.

FIG. 7 is a view illustrating the disposal of an (1×M)×N phase array in which plural 1×M radiator arrays are vertically disposed according to an embodiment. FIG. 8 is a schematic view illustrating a scheme of scanning a light beam using the (1×M)×N phase array of FIG. 7.

As shown in FIG. 8, the angles ($\Theta$), which are formed in a longitudinal direction by each beam radiated from each radiator array, may be differently assigned to the arrays. For example, the angle $\Theta_1$ 800-1 may be assigned to the $1^{st}$ 1×M radiator array 805-1, the angle $\Theta_2$ 800-1 may be assigned to the $2^{nd}$ 1×M radiator array 805-2, and the angle $\Theta_N$ 800-$n$ may be assigned to the $N^{th}$ 1×M radiator array 805-N. When each 1×M radiator array radiates beams at the corresponding latitude only in a longitudinal direction for scanning, the beam scanning may be performed in longitudinal and lateral directions on the whole, so that a two-dimensional (2D) scanning function is performed. In this case, the corresponding latitude 800-1 or 800-N of the 1×M radiator array may be determined by varying the period of a grating based on Equation 1 in case that the light wave radiator has a grating structure as shown in FIG. 4A, by varying the angle of a mirror in case that the light wave radiator has a mirror structure as shown in FIG. 4B, and by varying the geometric variables of a metal thin layer in case that the light wave radiator has a nano-metal thin layer structure.

Figure 9:
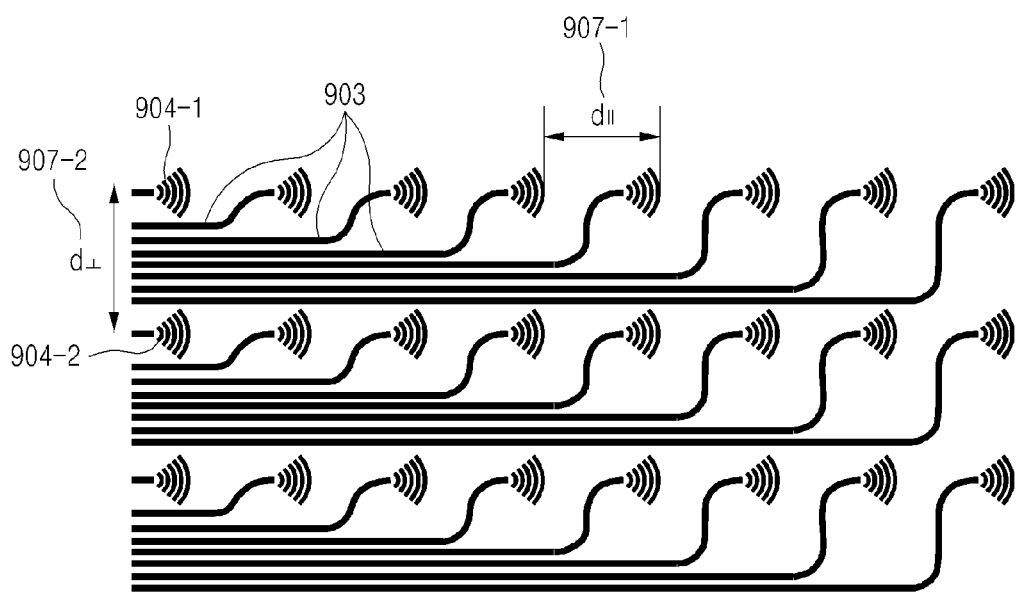
FIG. 9 is a view illustrating an (M×N) radiator array disposed in a two-dimensional phased array according to an embodiment.

FIG. 9 is a view illustrating an (M×N) radiator array disposed in a two-dimensional phased array according to an embodiment.

FIG. 9 shows M×N radiators arrayed in a two-dimensional phased array for illustrating another embodiment for achieving the 2D scanning function. The M×N radiator array has a feature of using phase interference between the light waves of the longitudinal arrays as well as the lateral arrays. To use the phase interference in a longitudinal direction, the interval $d_\perp$ 907-2 between the radiators 904-1 and 904-2 disposed in the longitudinal direction is narrow as compared with that of the interval $d_{//}$ 907-1 between the radiators disposed in the lateral direction, and phase supply wires 903 connected to the 1×M radiator array are disposed in the narrow interval. Describing the features of the phase array of FIG. 7 in comparison with that of FIG. 9 again, the (1×M)×N phased array of FIG. 7 uses the phase interference between the radiator arrays not in the longitudinal direction but in the lateral direction. Thus, the disposal interval 707 of the radiator arrays in the longitudinal direction may be freely enlarged.

FIG. 9 shows the light wave radiators 904-1 and 904-2 of the M×N two-dimensional phased array configured in the grating structure of FIG. 4A, but the embodiment is not limited thereto. The light wave radiators 904-1 and 904-2 of the M×N two-dimensional phased array may be configured in the mirror structure of FIG. 4B or in the nano-metal thin layer structure of FIG. 4C. As shown in FIG. 9, when the light wave radiators 904-1 and 904-2 are configured in the grating structure, since the intervals between the light wave radiators in all directions are narrow, a length of the grating, that is, the number of periods is limited. Thus, when the number of grating periods is small, the radiation efficiency may be deteriorated due to phase interference.

Figure 10:
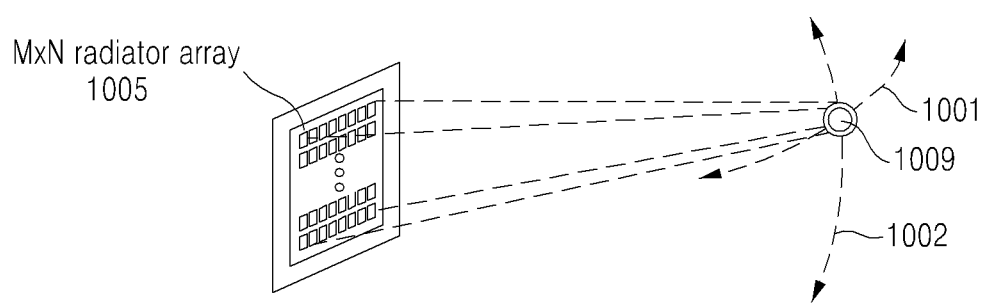
FIG. 10 is a schematic view illustrating a scheme of scanning a light beam using the M×N two-dimensional phase array of FIG. 9.

FIG. 10 is a schematic view illustrating a scheme of scanning a light beam using the M×N two-dimensional phase array of FIG. 9.

FIG. 10 illustrates processes of forming a light beam and scanning the light beam through the M×N two-dimensional phase array of FIG. 9. The equivalent phase differences $\Delta\phi$ of each lateral light way radiator of the M×N two-dimensional radiator array may be sequentially varied in the range of $-\pi \leq \Delta\phi \leq +\pi$. In addition, the equivalent phase differences $\Delta\phi'$ of each longitudinal light way radiator of the M×N two-dimensional radiator array may be sequentially and independently varied in the range of $-\pi \leq \Delta\phi' \leq +\pi$.

A beam having a narrow divergence angle may be formed in a space due to the interference between the radiated light waves radiated from the radiators of the M×N two-dimensional radiator array disposed in such a phased array. As the difference from the 1×M one-dimensional phased array of FIGS. 6A and 6B, although the one-dimensional phased array performs active beam scanning only in a lateral direction, the two-dimensional phased array may perform active beam scanning 1002 and 1002 in lateral and longitudinal directions. In addition, although the one-dimensional phased array radiates a light beam 609, 809-1 or 809-N generated when the phase interference occurs only in the lateral direction, the two-dimensional phased array 1005 radiates a light beam 1009 generated when the phase interference occurs in the lateral and longitudinal directions. When the phase interference occurs effectively, although an elliptical-sharped beam 609, 809-1 or 809-N, which has a divergence angle in the lateral direction narrower than that in the longitudinal direction, may be generally obtained through the one-dimensional phased array 605, a substantially circular-shaped light beam 1009, which has a divergence angle narrow in the lateral and longitudinal directions, may be obtained through the two-dimensional phased array 1005.

According to the phase interference principle, the phase coherent beam obtained from the two-dimensional phased array may be formed with beams of $0^{th}$-order, $1^{st}$-order, $2^{nd}$-order, . . . , arrayed in a matrix form in the lateral and longitudinal directions. FIG. 10 schematically shows a section of the beam of $0^{th}$-order having the strongest light intensity at a predetermined distance. In the radiator array 905 shown in FIG. 9, the angle of the lateral scanning using the $0^{th}$-order beam, that is, the longitudinal range may be determined by the lateral interval $d_{//}$ 907-1 between the radiators. The angle of the longitudinal scanning, that is, the latitudinal range may be determined by the longitudinal interval $d_\perp$ 907-2 between the radiators in the radiator array 905 shown in FIG. 9. According to the phase interference principle, $d_{//}$ as 907-1 is narrowed, the lateral scanning range obtained from the $0^{th}$-order beam may be more enlarged. In addition, as $d_\perp$ 907-2 is narrowed, the longitudinal scanning angle may be enlarged.

Although the interval $d_{//}$ 907-1 or $d_\perp$ 907-2 of the two-dimensional phased array may be narrowed to enlarge the scanning range, if the interval $d_{//}$ 907-1 or $d_\perp$ 907-2 is narrowed, as the example of FIG. 9, plural phase supply wires must be formed within the interval $d_{//}$ 907-1 or $d_\perp$ 907-2. When plural phase supply wires are formed within the narrow interval, since a coupling occurs between the light waves of the phase supply wires, the phases supplied to the light wave radiators may be disturbed and the light intensity may be lowered, so that the function of forming a beam is deteriorated. Accordingly, M and N of the nano-photonics-based M×N phased array 905 are limited by the interval $d_{//}$ 907-1 or $d_\perp$ 907-2. As M and N become greater, a defined light beam 900 may be obtained in principle. However, for the above-described reason, it is difficult to increase M and N.

Although the M×N two-dimensional phased array according to an embodiment may have the above-described problems, the problems may be solved by the (1×M)×N phased array of FIGS. 7 and 8 in which N 1×M one-dimensional radiator arrays are arrayed in a longitudinal direction. In other words, since the longitudinal interval h 707 and 807 between the 1×M one-dimensional radiator arrays may be independently enlarged, and any phase supply wires are not required to be arranged within the lateral interval d 507 of the 1×M radiator array, the numbers M and N may be freely increased.

According to the embodiment, the device constituting the photonic phased array antenna may be phase-controlled by using electro-optic effect, so that the consumed power may be reduced and the operating speed may be increased.

According to the device constituting the photonic phased array antenna of the embodiment, the optical power distributor is provided with 1:M optical power distributors connected in parallel to each other in a multiple stage manner such that optical power may be relatively and uniformly supplied to the light wave radiator array. In addition, the light wave radiator is proposed in a structure such as a grating structure, a mirror structure or a nano-metal thin layer structure, so that various functions may be implemented according to applications.

According to the device constituting the photonic phased array antenna of the embodiment, in case of the radiator array and the phase supply wires, only the radiators are disposed in the 1×M light wave radiator array and the phase supply wires are disposed outside the light wave radiator array, so that the scanning angle of the phase coherent beam radiated from the radiator array may be enlarged.

According to the device constituting the photonic phased array antenna of the embodiment, in the two-dimensional (2D) array of the phase array, the 1×M light wave radiator arrays may be disposed in a longitudinal direction so that the longitudinal interval between the radiator arrays may be independently enlarged, thereby improving design freedom in designing a device structure.

According to the device constituting the photonic phased array antenna of the embodiment, the angles of each 1×M radiator array formed in the longitudinal direction may be assigned to the beams radiated from each 1×M radiator array differently from each other, so that a 2D-scanning function capable of scanning a beam in the lateral and longitudinal directions on the whole may be achieved.

While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A device constituting a photonic phased array antenna, the device comprising:
    at least one light source;
    an optical power distributor configured to distribute a light wave generated from the light source;
    a phase controller configured to control a phase of the light wave; and
    a light wave radiator configured to radiate the light wave into a space based on the controlled phase,
    wherein optical waveguides are connected between the light source and the optical power distributor, between the optical power distributor and the phase controller and between the phase controller and the light wave radiator, respectively,
    wherein the phase controller comprises a semiconductor P-N iunction structure or a semiconductor P-I-N iunction structure, and controls the phase by varying a refractive index using electro-optic effect according to a change of a carrier concentration, and wherein the carrier concentration is varied with an injected current or an applied voltage.

2. The device of claim 1, wherein the phase controller obtains the change of the refractive index by applying a forward voltage or a reverse voltage to the semiconductor P-N junction structure or the semiconductor P-I-N junction structure.

3. The device of claim 1, wherein the semiconductor P-I-N junction structure comprises a P-type doped region, an I region, an N-type doped region which are formed in or near the optical waveguide, electrodes are formed in the P-type doped region and the N-type doped region near the optical waveguide, the refractive index is varied by applying the voltage or current to the electrodes, and a phase of a light wave output through the doped regions is varied as the refractive index is varied.

4. The device of claim 1, wherein the semiconductor P-N junction structure comprises a P-type doped region and an N-type doped region which are formed in or near the optical waveguide, electrodes are formed in the P-type doped region and the N-type doped region near the optical waveguide, the refractive index is varied by applying the voltage or current to the electrodes in a state the light wave is input to the optical waveguides, and a phase of the light wave output through the doped regions is varied as the refractive index is varied.

5. The device of claim 1, wherein the light wave radiator is formed in at least one of a grating structure, a mirror structure, or a nano-metal thin layer structure.

6. The device of claim 1, wherein the optical power distributor distributes the light wave generated from the light source into N phase controllers (N being a natural number), and is configured by using a single 1:N distributor or 1:N distributors connected in a multiple stage.

7. The device of claim 1, wherein the light wave radiator is formed by arraying one-dimensional 1×M radiator arrays, and one-dimensionally scans a beam into a space in a lateral direction which is equal to an alignment direction of light wave radiators of the one-dimensional 1×M radiator arrays by sequentially varying the phase of the light wave supplied to each light wave radiator.

8. The device of claim 1, wherein the light wave radiator is formed by arraying one-dimensional 1×M radiator arrays in a longitudinal direction, beam forming latitudes of each 1×M radiator array are set to be different from each other, and each 1×M radiator array performs a beam scanning in a longitudinal direction at a corresponding latitude according to a phase control such that a two-dimensional beam scanning is performed.

9. The device of claim 1, wherein the light wave radiator is implemented with a two-dimensional M×N radiator array, phases supplied to each light wave radiator are sequentially controlled such that the phases are different from each other in lateral and longitudinal directions to perform a beam scanning in a two-dimensional space.

* * * * *